P. & B. Brown.
Mill Stone Dresser.
No 92,935. Patented Jul. 27, 1869.
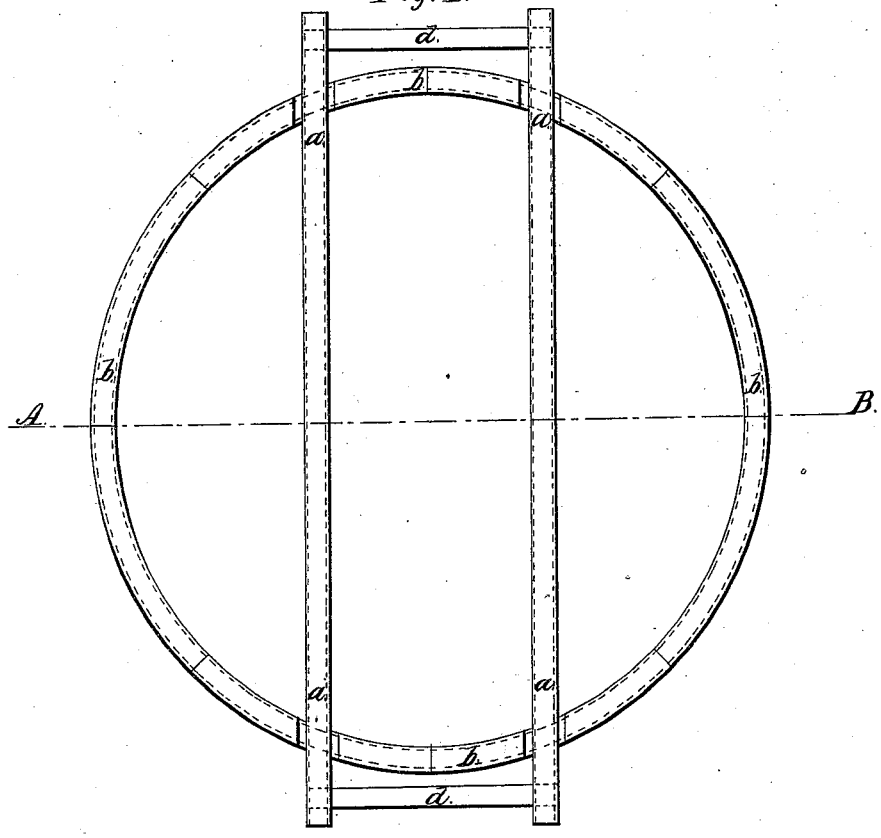
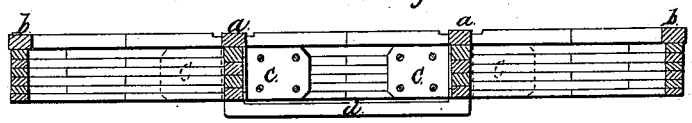
Witnesses.
Geo. Pitt
Jno. Alcock
Inventor.
Potto Brown
Bateman Brown

UNITED STATES PATENT OFFICE.

POTTO BROWN, OF HOUGHTON, AND BATEMAN BROWN, OF HUNTINGDON, ENGLAND.

IMPROVEMENT IN MILLERS' STAFFS.

Specification forming part of Letters Patent No. 92,935, dated July 27, 1869; patented in England, June 23, 1868.

*To all whom it may concern:*

Be it known that we, POTTO BROWN, of Houghton, and BATEMAN BROWN, of Huntingdon, England, subjects of the Queen of Great Britain, have invented or discovered a new and useful improved staff or instrument to be used to ascertain the irregularities in the surfaces of millstones with a view to their correction; and we, the said POTTO BROWN and BATEMAN BROWN, do hereby declare the nature of the said invention, and in what manner the same is to be performed, to be particularly described and ascertained in and by the following statement thereof—that is to say:

This invention has for its object an improved staff or instrument to be used to ascertain the irregularities in the surfaces of millstones with a view to their correction.

At the present time a single straight-edge, of wood, is used for this purpose. It has a thin coating of color given to it, and it is thus applied to the stone.

The object of the workman in applying the staff is to mark the high parts of the stone; but great care and skill are required in producing a plane or true surface by the indications of this instrument, as the staff will also color the low sides of the stone, provided there is a hollow extending across the stone from side to side.

Now, according to our invention, in place of forming the staff as a single straight-edge, so that it gages the stone only in one straight line across it, we so form the staff as to gage the stone simultaneously in several lines, so arranged that, should the stone be low on any side, the staff may be sure to take a bearing on the high side only, and be prevented from falling into the hollows to color them.

We prefer to construct the staff of two parallel straight-edges connected together by a circle somewhat smaller in diameter than the stone. The whole is built up of wood in such manner as to insure it, as far as possible, against warping, and the face which comes in contact with the stone is made of mahogany. This face is wrought truly to form, and is corrected from a true metal surface as frequently as may be necessary.

When the instrument is in use color is applied to the straight-edges, or it may be to the whole of its face, and the instrument is applied to the stone with one of the straight-edges on either side of the center or eye. These edges (if they alone be colored, as we prefer,) communicate the color to the high parts on which they may chance to bear; but should it so happen that the highest parts are not beneath the edges, then the ring sustains them out of contact with the face of the stone.

The form of the instrument may be to some extent varied; but it will be observed that, whereas the staff heretofore employed is a straight-edge, taking its bearings along one line only, our improved staff is in principle an extended skeleton surface, which, however it may be applied, takes its bearing on the high side and high parts of the stone only. This skeleton surface or frame is very portable and convenient in use. It is kept true without difficulty, and is easily coated with color—advantages which a complete surface would not have, and the absence of which renders a complete surface inapplicable.

In the drawings hereunto annexed is shown a staff constructed in the manner we prefer for carrying out our invention.

Figure 1 is a face view of the staff, and Fig. 2 a transverse section of the same, taken at the line A B.

$a$ $a$ are two parallel straight-edges, each composed of layers or thicknesses of mahogany, held together with screws, the object of so constructing the straight-edges being to avoid warping. The two straight-edges are connected together by a circle, $b$, which is somewhat smaller in diameter than the stone. This circle is also built up of layers of mahogany, held together by screws, each layer being composed of numerous segments, as shown. The segments of one layer are also made to break joint with the segments of the layer next to it, so that the ring may be of equal strength throughout.

At the points where the straight-edges are connected to the circle both the circle and the straight-edges have notches cut into them, as shown at Figs. 3 and 4, Fig. 3 showing the form of the notch cut into the circle, and Fig. 4 the form of the notch cut in the straight-edges.

The circle and straight-edges, with notches so cut into them, are placed together and attached one to the other by metal angle-pieces c c, as shown. The ends of the straight-edges are also connected to one another by wooden cross-bars d d, which serve as handles, by which the staff may be held when in use.

When the staff has been put together, as above described, the faces of the straight-edges and of the circle are, by the aid of a true metal surface, reduced to an even plane, and this plane surface is from time to time corrected, as frequently as may be necessary.

We do not claim to have invented a miller's staff consisting of a single straight-edge or bar of wood having one of its edges reduced to a true or plane surface; but

What we claim as our invention, and desire to secure by Letters Patent, is—

The skeleton miller's staff hereinbefore described, the same being composed substantially of two straight-edges rigidly connected together, so as to form a skeleton frame with a plane surface, for the reception of the coating of color which is to be transferred to the high parts of the millstone.

POTTO BROWN.
BATEMAN BROWN.

Witnesses:
G. F. WARREN,
THOS. BROWN,
Both of No. 17 Gracechurch Street, London.